United States Patent [19]

Meadows et al.

[11] Patent Number: 5,356,735
[45] Date of Patent: Oct. 18, 1994

[54] HEATED/COOLED BATTERY

[75] Inventors: Clarence A. Meadows, Muncie; James R. Bish, Anderson, both of Ind.

[73] Assignee: General Motors Corporation, Detroit, Mich.

[21] Appl. No.: 58,187

[22] Filed: May 10, 1993

[51] Int. Cl.⁵ .......................................... H01M 10/50
[52] U.S. Cl. ................................ 429/120; 429/148
[58] Field of Search ............................... 429/120, 148

[56] References Cited

U.S. PATENT DOCUMENTS

| | | | |
|---|---|---|---|
| 1,587,425 | 6/1926 | Schepp | 429/120 |
| 2,410,952 | 11/1946 | Lighton | 136/161 |
| 3,110,633 | 11/1963 | Bachmann | 429/120 X |
| 3,623,916 | 11/1971 | Toyooka et al. | 136/161 |
| 3,745,048 | 7/1973 | Dinkler et al. | 136/161 |
| 3,834,945 | 9/1974 | Jensen | 429/120 |
| 4,107,402 | 8/1978 | Dougherty et al. | 429/120 |
| 4,865,928 | 9/1989 | Richter | 429/120 |
| 4,865,929 | 9/1989 | Eck | 429/120 |

FOREIGN PATENT DOCUMENTS

| | | | |
|---|---|---|---|
| 59-091658 | 5/1984 | Japan | 429/120 |
| 569756 | 6/1945 | United Kingdom | 429/120 |

Primary Examiner—Stephen Kalafut
Attorney, Agent, or Firm—Lawrence B. Plant

[57] ABSTRACT

A temperature controllable electric storage battery having monobloc construction and including thin, planar, heat exchangers placed throughout the battery between the electrode plates thereof. Preferably, the heat exchangers will comprise the intercell partitions of the battery container and the liquid passages therein will have an elongated cross section in a direction transverse the passage so as to provide a wide passage having the majority of the surface defining the passage lying in planes substantially parallel to the external face of the heat exchangers.

13 Claims, 6 Drawing Sheets

HEATED/COOLED BATTERY

This invention relates to multicell electric storage batteries having a monobloc construction including an internal heat exchanger for each cell.

BACKGROUND OF THE INVENTION

There are times during a battery's life when it would be desirable to control its internal temperature. For example, it would be desirable during initial formation of a Pb-acid battery to remove the heat generated therein during the formation process and thereby accelerate the formation process without damaging the battery. Moreover, in the case of traction batteries for electric vehicles, it would be desirable to remove heat from the battery pack (i.e., a plurality of multicell, monobloc batteries electrically coupled together) during periods of high rate charge or discharge and thereby prevent damage to the battery pack. Still further, during the charging of such electric vehicle battery packs it would be desirable to insure that all the individual batteries, and indeed all the individual cells are at about the same temperature so as to insure proper charge balance from one cell to the next within the pack. Finally, in cold climates it would be desirable to preheat the battery before usage and/or to heat the battery while in use to achieve optimal output therefrom.

Techniques used heretofore for heating/cooling batteries have not been particularly effective to evenly rapidly add/remove large amounts of heat from a battery. This is particularly true for gas recombinant batteries which utilize electrolyte-immobilizing, interplate separators and thereby prevent convection cooling of the battery incident to the circulation of electrolyte in each cell. It is particularly difficult to heat/cool monobloc batteries wherein a plurality of cells are housed contiguously side-by-side each other within a single container, which makes it impossible to circulate coolant (e.g., air) around the outside of each cell.

It is an object of the present invention to provide a unique monobloc, multicell electric storage battery having a substantially planar, liquid-heated/cooled heat exchanger in each cell of the battery which heat exchanger has a high heat exchange surface area confronting a substantial area of at least one plate of each cell element in the battery so as to add and/or extract heat from such element under extreme operating temperature conditions. It is another object of the present invention to incorporate such a heat exchanger into the intercell partition of a monobloc battery container. It is still another object of the present invention to locate such heat exchanger within a cell element itself. These and other objects and advantages of the present invention will become more readily apparent from the detailed description thereof which follows.

BRIEF DESCRIPTION OF THE INVENTION

The present invention comprehends a multicell, electric storage battery comprising a monobloc container having a plurality of separate cell compartments therein. Each compartment contains a galvanic cell element comprising a plurality of opposite polarity plates alternately interspersed one with the other and having interplate separators (e.g., electrolyte-immobilizing fibrous glass mats) therebetween as is well known in the art. A thin, substantially planar liquid cooled/heated heat exchanger is disposed within or adjacent each cell element and lies in a plane substantially parallel to the principle planes of the plates comprising the cell element. The heat exchanger has at least one external face which confronts at least one plate in the cell element, and at least one liquid flow passage therein proximate said face. The passage has an inlet means at one end and an outlet means at its other end for allowing the heat exchange liquid to pass through the heat exchanger. The battery includes appropriate conduits connected to the inlet and the outlet means for supplying and removing the heat exchange liquid to and from the passages.

The heat exchanger may be positioned at both ends of, at either end of, or at any location within, the cell element. The heat exchanger will preferably confront electrode plates on both sides thereof, and most preferably will comprise an intercell partition of the container which separates one cell compartment from the next. In a preferred embodiment and for the most effective heat exchange, the heat exchanger's internal passage will be relatively thin in the direction of the thickness of the heat exchanger and quite wide the direction normal to such thickness such that the majority of the surface defining the passage lies in a plane substantially parallel to the external face of the heat exchanger. In the most preferred embodiment of the invention, the inlet and outlet means lie along the top edge of the heat exchanger, and mate with inlet and outlet conduits (i.e., manifolds) formed in, the battery's cover. The heat exchanger is preferably made from two plates bonded together, face-to-face with one half of the inlet and outlet passages formed in one plate and one half in the other.

Heat exchangers in accordance with the present invention may be made from a variety of electrolyte-resistant (e.g., acid resistant), nonconductive materials such as polyethylene, polyvinylchloride or the like but preferably will be made from the same material as comprises the container 2 (e.g., preferably polypropylene).

The invention will better be understood when considered in the light of the following detailed description of a specific embodiment thereof which is given hereafter in connection with the several figures wherein.

DETAILED DESCRIPTION OF A PREFERRED EMBODIMENT OF THE INVENTION

Figure 1:
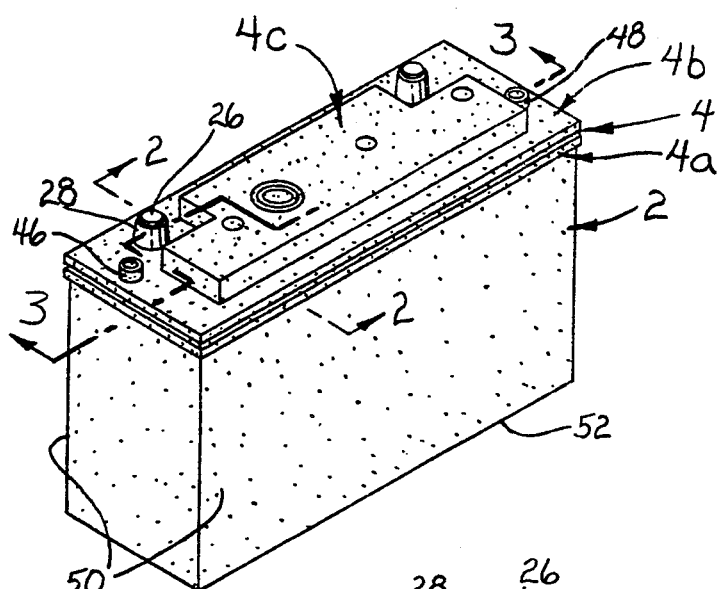
FIG. 1 is a perspective view of a monobloc, multicell, lead-acid electric storage battery in accordance with the present invention.
Figure 2:
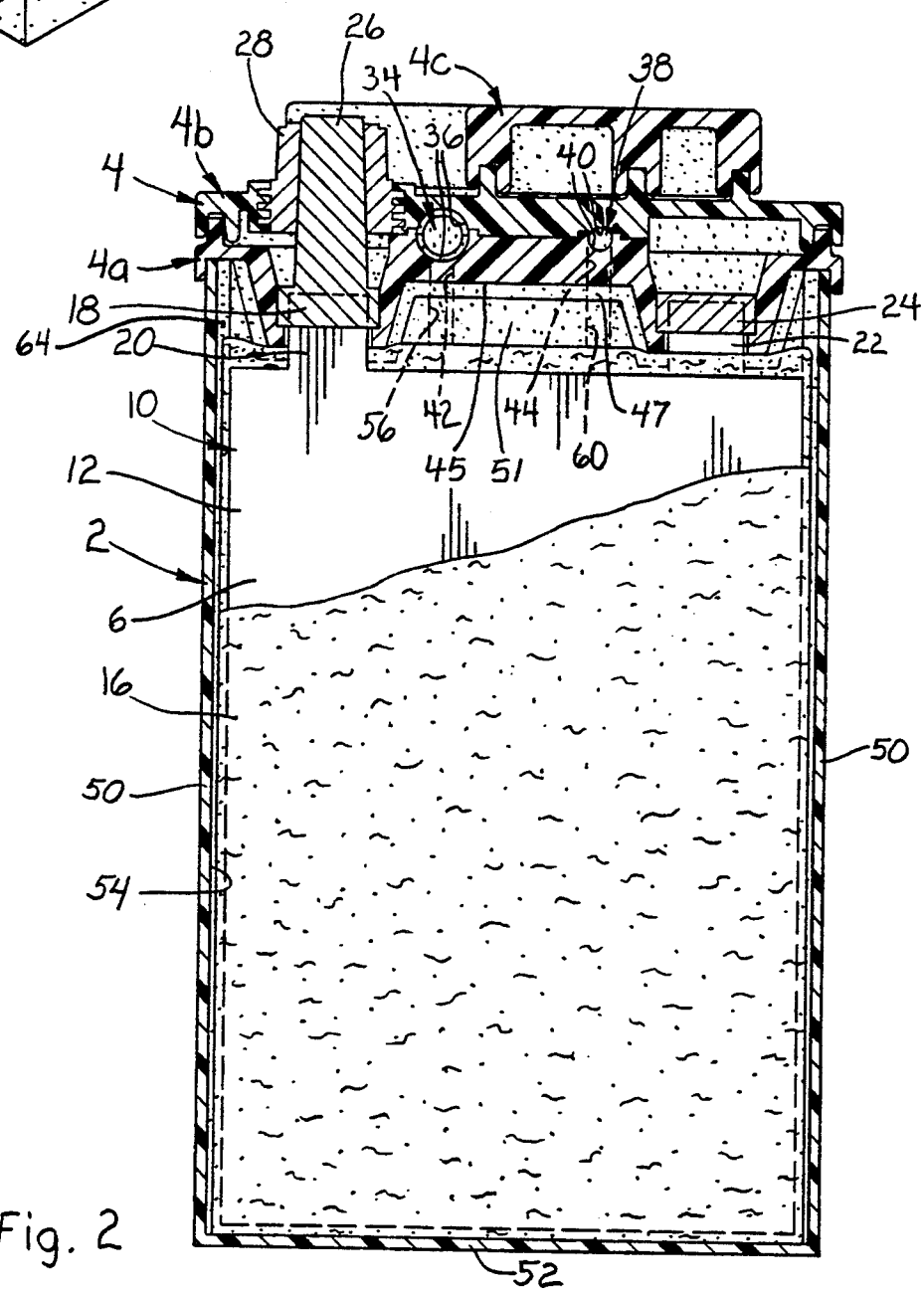
FIG. 2 is a partially broken away sectioned view in the direction 2—2 of FIG. 1.

The several Figures show a multicell, monobloc battery comprising a container 2 including a cover system 4 which itself comprises a first cover 4a, a second cover 4b and a third cover 4c. The several cover components 4a, 4b, and 4c join together so as to enclose a number of the features of the battery including its venting system, intercell connectors and manifolds for carrying the heat exchanger liquid in accordance with the present invention. The container 2 is divided into a plurality of individual cell compartments 6 each separated from the other by intercell partitions 8. A battery cell element 10 comprises a plurality of plates 12 of one polarity alternately interspersed between opposite polarity plates 14 and separated one from the other by a plurality of electrolyte permeable separators 16, as is well known in the art. The present invention is particularly useful with batteries which use separators 16 formed from fibrous glass mat and which are typically used in batteries of the so-called gas recombinant type. Separators in batteries of this type substantially immobilize the electrolyte by the wetting forces of the electrolyte on the glass fibers and thereby prevent any substantial movement of the electrolyte within the cell element as might otherwise occur by natural convection. Immobilization of the electrolyte substantially impedes the ability of the cell element to cool via natural convection incident to circulation of the electrolyte between the plates. Each plate 12 is connected to a plate strap 18 via a plate lug 20. Each plate strap 18 serves to electrically connect all of the plates 12 of like polarity in a given cell element. The opposite polarity plates 14 are likewise connected via plate lugs 22 to an opposite polarity plate strap 24 for the same purpose, as is well known to those skilled in the art. In the end cells, the plate straps (e.g., 18) are connected to a terminal post 26 which extends up through the center of, and welded to, a terminal bushing 28 positioned in the second cover 4b.

Figure 3:
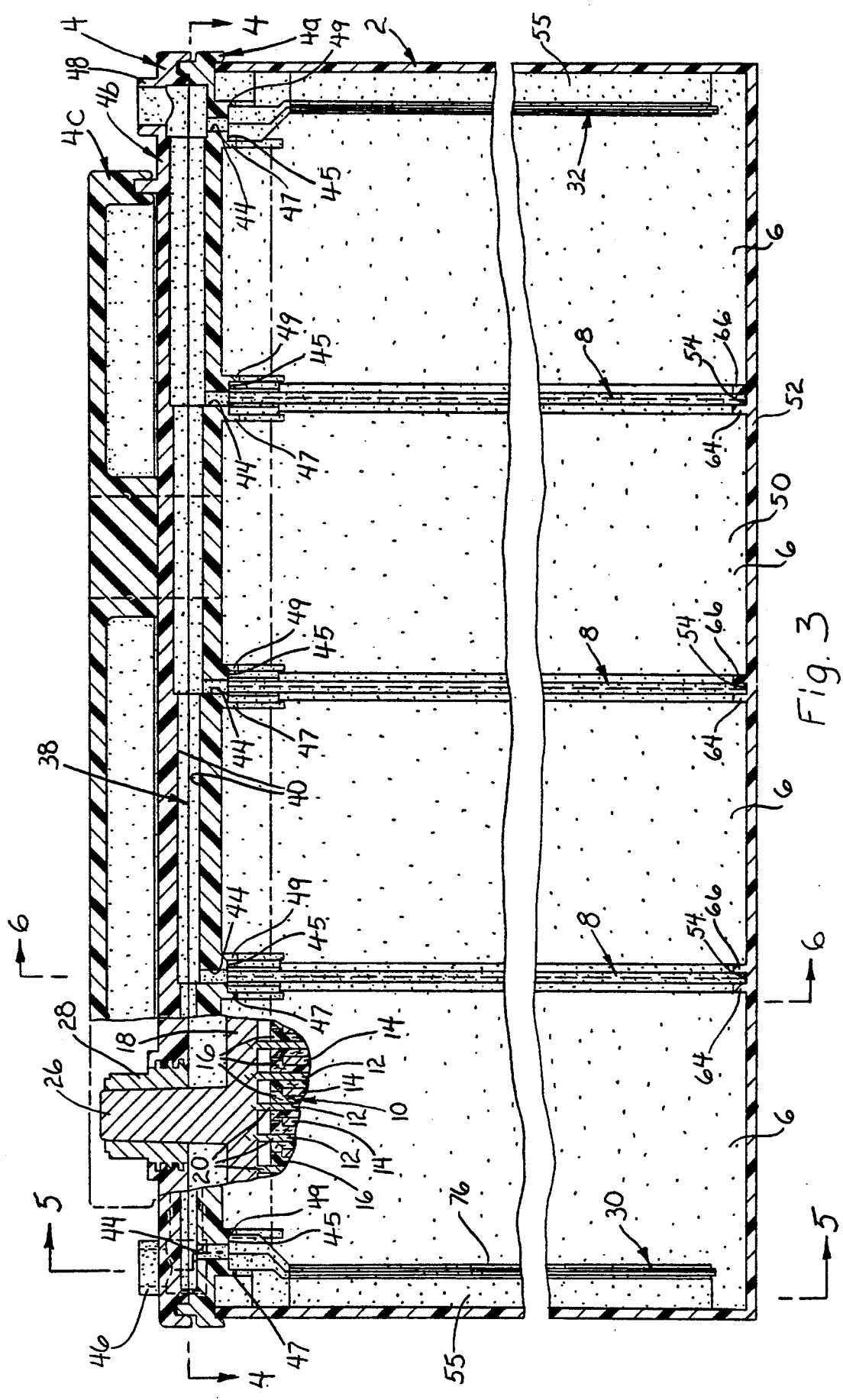
FIG. 3 is a partially sectioned view taken in the direction 3—3 of FIG. 1 with the heat exchangers shown in side elevation.
Figure 4:
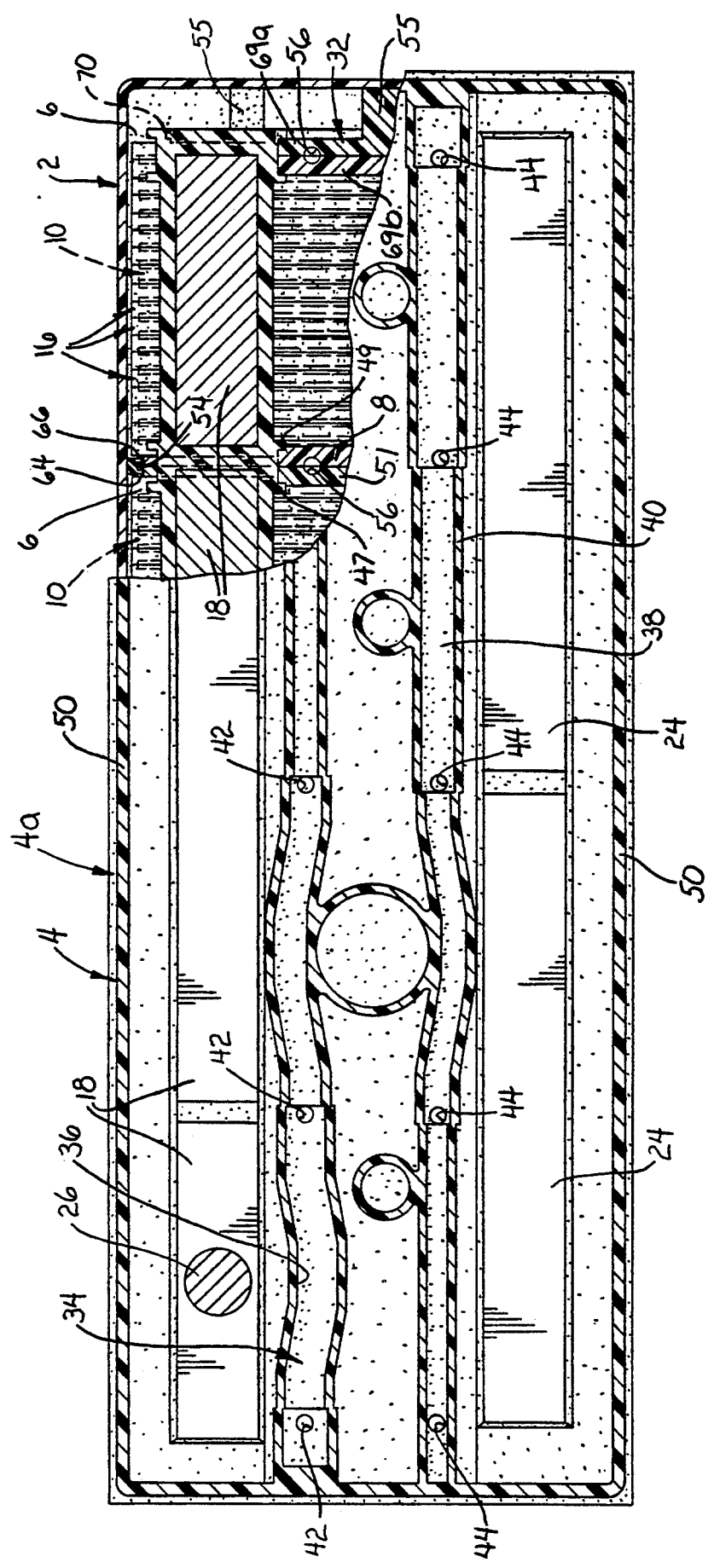
FIG. 4 is a sectioned view primarily in the direction 4—4 of FIG. 3, but with a partially broken away portion taken in a plane parallel to 4—4 but beneath the floor of the first cover.

As best shown in FIG. 3, the battery contains a plurality of thin (i.e., ca. 0.076 cm) planar heat exchangers 8, 30, 32 which confront the end plates of the several cell elements. In this preferred embodiment of the invention, the intercell partitions 8 are themselves heat exchangers in accordance with the present invention, and will be described in more detail hereinafter. Additional heat exchangers 30 and 32 are provided in each of the end compartments 6 of the container 2.

The several heat exchangers 8, 30, 32 each have an inlet 56 and an outlet 60 for supplying and exhausting liquid to/from a liquid passage 58 extending therebetween. The inlets 56 to the several heat exchangers are connected to a common conduit/manifold 34 formed by molding mating channels 36 in the first and second covers 4a and 4b. Similarly, the outlets 60 from the heat exchangers are joined to a common exhaust manifold 38 similarly formed by mating channels 40 formed into the first and second covers 4a and 4b. The inlet manifold 34 has a plurality of ports 42 which communicate with the inlets 56 to the heat exchanger while the exhaust manifold 38 has a plurality of ports 44 which similarly communicate with the exhaust outlets 60 from the heat exchangers 8, 30, 32. The inlet manifold 34 varies in cross section from wide to narrow from one end to the other starting with the inlet end. An inlet nipple 46 is provided at the inlet end, is in flow communication with the inlet manifold 34 and extends outside the container for receipt of an appropriate hose, or the like, for supplying liquid to the battery. Similarly, the exhaust manifold 38 varies in cross section from narrow to wide from one end to the other starting with the end opposite the outlet end. An outlet nipple 48 is provided at the outlet end, is in flow communication with the exhaust manifold 38 and is adapted to receive a hose or the like for removing the heat exchange liquid from the battery. Thusly, varying the cross sections of the manifolds allows for a substantially uniform parallel flow rate of heat exchange liquid through several heat exchangers at the same time. Beneath each port 42, 44 lies a pocket 45 molded into the underside of the first cover 4a. The pocket 45 is defined by depending opposing walls 47 and 49, and receives, in nesting fashion, a complementarily-shaped junction block 48 on the heat exchanger. The junction block 51 contains the inlet and outlet for each heat exchanger and sealingly mates with the pocket 45 in snug fit so as to insure that no heat exchange liquid leaks into the cell compartments 6. Sealant may be applied to the interface between the junction block 51 and the pocket 45 to insure fluid tightness of this joint.

Prior to positioning the cover 4a onto the container 2 the heat exchanger partitions 8 are positioned in the container 2 in their proper location so as, preferably, to have their perimeters sealingly engage the side walls 50 and bottom wall 52 of the container 2. In the embodiment illustrated in FIG. 3, this may be accomplished by providing a channel 54 along the side wall 50 and bottom wall 52 into which the partition 8 is positioned and sealed. The channel 54 is molded into the side walls and bottom wall of the container and is defined by opposing ribs 64 and 66. The intercell partition heat exchanger 8 is sealed (e.g., with sealant or ultrasonic welding, etc.) into the channel 54 to provide a substantially fluid-tight seal between adjacent cell compartments 6. An alternative embodiment will be discussed in conjunction with FIGS. 10–12.

Figure 5:
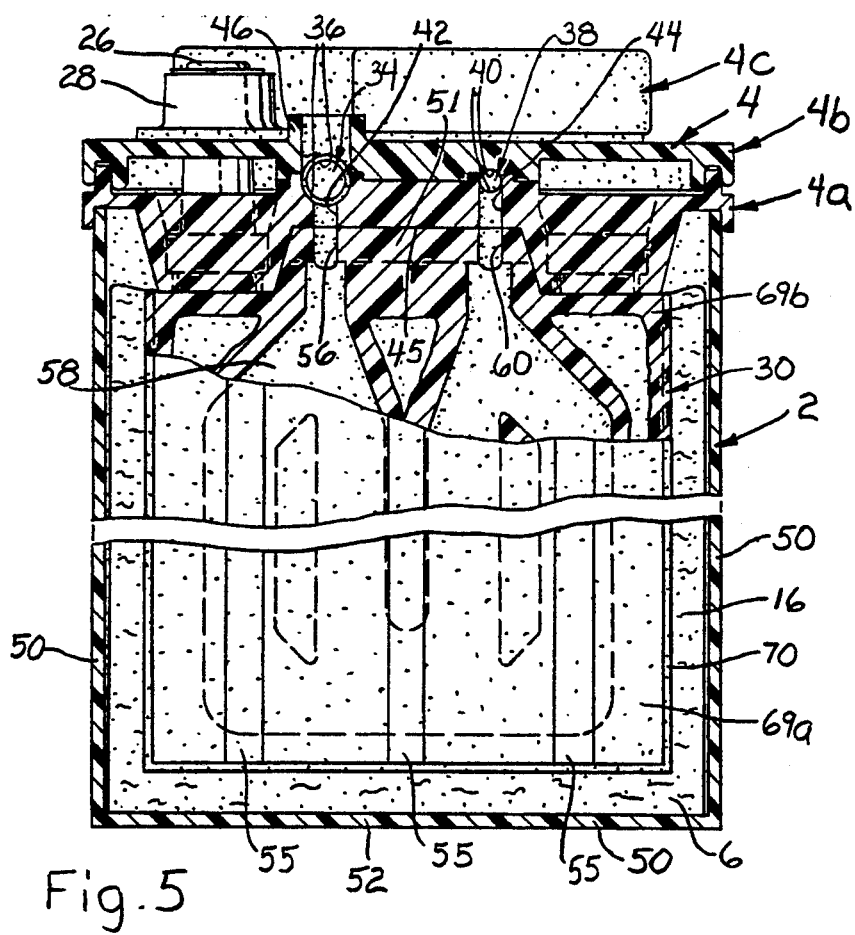
FIG. 5 is a sectioned view in the direction 5—5 of FIG. 3.
Figure 6:
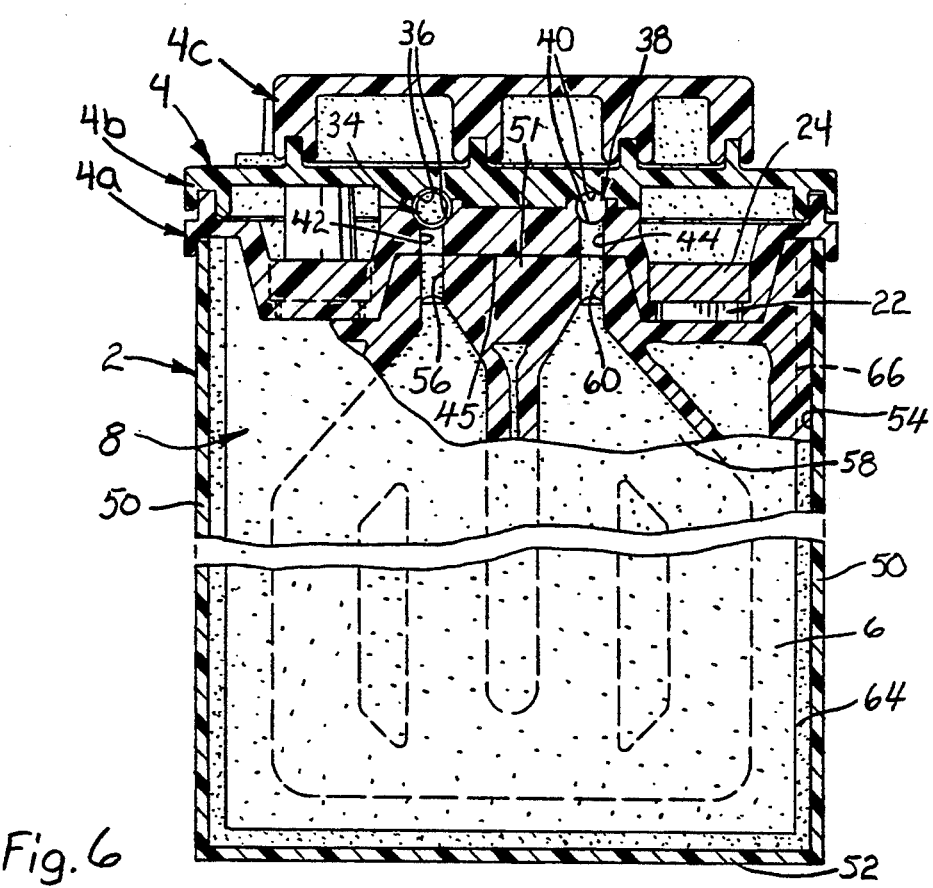
FIG. 6 is a sectioned view in the direction 6—6 of FIG. 3.
Figure 8:
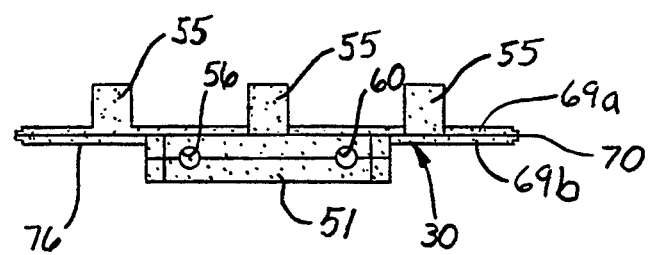
FIG. 8 is a top view of the heat exchanger taken in the direction 8—8 of FIG. 7.
Figure 9:
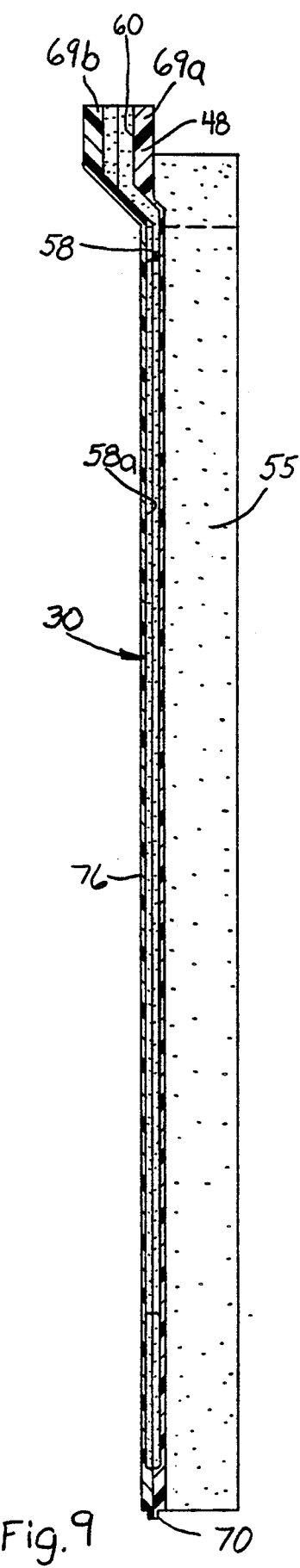
FIG. 9 is a side section view in the direction 9—9 of FIG. 7.

FIG. 5 shows a partially broken away, elevational view of the heat exchanger 30 in position in the end cell compartment of container 2. As this heat exchanger 30 does not function as an intercell partition, there is no need for the perimeter thereof to sealingly engage either the side walls or the bottom wall of the container 2, and, accordingly, this perimeter is shown as being spaced from those walls. Stand-off ribs 55 space the heat exchanger 30 from the end walls of the container 2 where necessary. The junction block 48 is nested in the pocket 46 such that the inlet 56 to the passage 58 registers with the port 42 from the supply manifold 34, and the outlet 60 from the passage 58 registers with the port 44 of the exhaust manifold 38. As best shown in FIGS. 3, 8 and 9, the junction block 48 of the heat exchanger 30 at the ends of the end cell is offset from the main body of the heat exchanger 30 to permit placement of the main body portion of the heat exchanger closer to the end wall of the container 2 without complicating the coupling of the junction block to the supply and exhaust manifolds.

Figure 10:
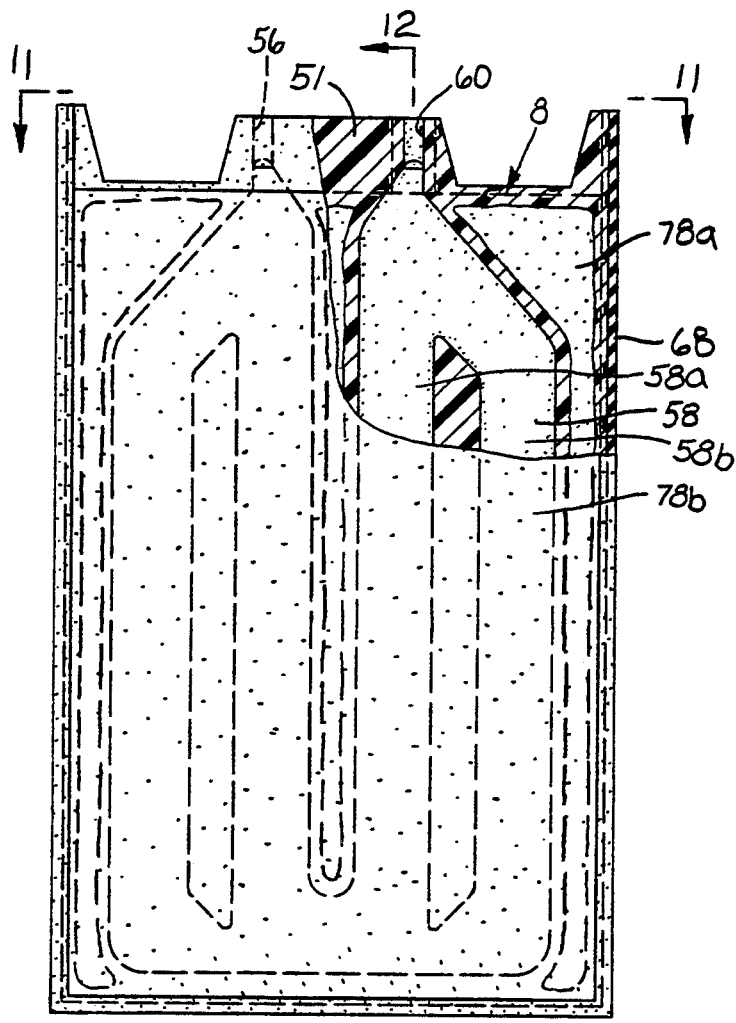
FIG. 10 is a view of an intercell partition heat exchanger shown partially in elevation and partially in section.
Figure 11:
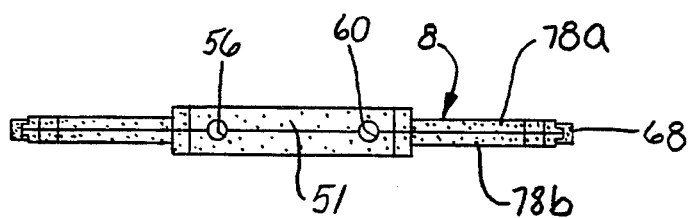
FIG. 11 is a top view of the heat exchanger taken in the direction 11—11 of FIG. 10.
Figure 12:
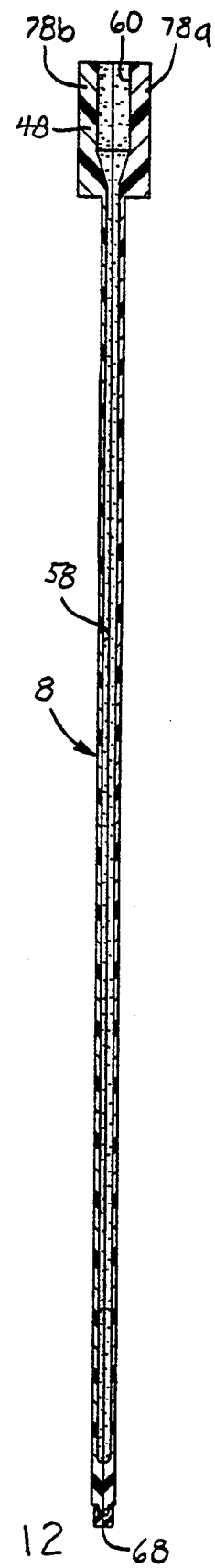
FIG. 12 is a sectioned side view in the direction 12—12 of FIG. 10.

FIGS. 10–12 show another embodiment of the present invention wherein the intercell partition heat exchanger 8 has a soft, acid-resistant, rubber gasket 68 affixed to its periphery. When the partition 8 is positioned in the container 2, the rubber seal compresses sufficiently to provide a liquid-tight seal between adjacent cell compartments. This type of seal is seen to be particularly effective in immobilized-electrolyte type cells where the likelihood of electrolyte bridging between adjacent cells is reduced anyway due to the immobilization thereof within the separator.

Figure 7:
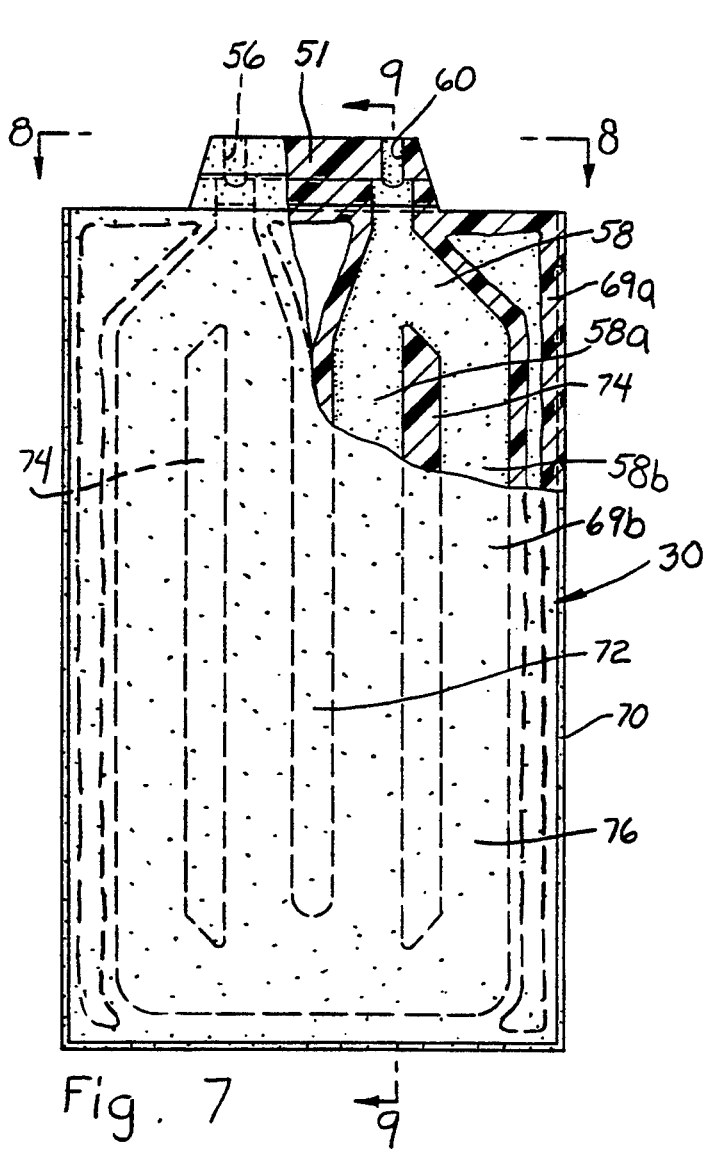
FIG. 7 is a view of a heat exchanger shown partially in elevation and partially broken away.

FIGS. 7-9 show a substantially planar, plate-like heat exchanger 30 formed from two plates 69a and 69b sealed together (i.e., preferably by heat or ultrasonically) along its periphery 70. Moreover, the plates 69a and 69b are similarly sealed inboard the periphery at several locations 72 in such a manner as to define a tortuous liquid flow passage 58. Islands 74 are similarly formed by heat or ultrasonically sealing the plates 69a and 69b together so as to divide the passage 58 into two branches 58a and 58b for more uniform flow of the heat exchange liquid. The island 74 also serves to hold the plates 69a and 69b together within the passage 58 to thereby prevent any bulging of the passage 58 incident to the pressure being applied to the heat exchange liquid. The fluid passages 58a and 58b are quite thin (i.e., ca. 0.066 cm) in the direction of the thickness of the heat exchanger but quite wide (i.e., Ca. 0.5 cm) in the plane parallel to the principle plane of the plate-like heat exchanger. This configuration provides a very high heat exchange surface opposite the working face 76 of the heat exchanger for most effective heat transfer.

FIGS. 10-12 show an intercell-partition-type heat exchanger, similar to the partition 8 in FIG. 3, but including a rubber gasket 68 affixed to the periphery thereof for sealingly engaging the side and bottom walls of the container 2 as an alternative to the channel 54 previously discussed. Otherwise, the plate-like heat exchanger is formed by bonding plates 78a and 78b together in the same manner as described in conjunction with FIGS. 7-9. In both instances (i.e., FIGS. 7-9 and FIGS. 10-12) one half of the liquid flow passage 58 is formed in one of the plate-like members 78a and the other half formed in the other plate-like members 78b to form the complete passage 58 when the two plates are joined together as discussed above.

Preferably, and as shown in the Figures, the several heat exchangers will be connected in parallel such that the liquid flows from one manifold to the next in parallel flow through all of the heat exchangers at once. Alternatively, the outlet of one heat exchanger could be coupled to the inlet of the next such that the liquid flows in series from one heat exchanger to the next.

While the invention has been disclosed primarily in terms of specific embodiments thereof it is not intended to be limited thereto, but rather only to the extent set forth in the claims which follow.

The embodiments of the invention in which an exclusive property or privilege is claimed are defined as follows:

1. In a multicell, electric storage battery comprising a monobloc container having bottom, end and side walls defining a plurality of cell compartments, a cover for said container, a plurality of galvanic cell elements each housed in a separate cell compartment within said container, and an electrically nonconductive intercell partition engaging said side and bottom walls for separating one said cell compartment from the next, the improvement wherein said partition comprises first and second external faces on opposite sides thereof each of said faces confronting a one of said elements in an adjacent cell compartment, at least one liquid flow passage formed in said partition interjacent said faces, inlet means at one end of said passage for supplying liquid to said passage, outlet means at the other end of said passage for exhausting said liquid from said passage, and conduit means connected to said inlet and said outlet means for respectfully supplying and removing said liquid from said passage, whereby liquids can be circulated through said passages to add heat to or extract heat from within the innards of said battery directly through said faces.

2. A battery according to claim 1 wherein, said passage has an elongated cross section in a direction transverse said passage so as to provide a wide passage having the majority of the surface defining the passage lying in planes substantially parallel to said external faces.

3. A battery according to claim 1 wherein said conduit means connects the outlet means of one passage to the inlet means of another passage in the next adjacent partition in said container for flowing said liquid through said passages in series.

4. A battery according to claim 1 wherein said conduit means comprises an inlet manifold connected to a plurality of said inlet means and an exhaust manifold connected to a plurality of said outlet means for flowing said liquid through said passages in parallel.

5. A battery according to claim 1 wherein said inlet and outlet means lie on an edge of said partition.

6. A battery according to claim 5 wherein said manifolds reside in said cover and sealingly mate with said inlet and outlet means at the upper edge of said partition.

7. A battery according to claim 1 wherein said conduit means comprises discrete pieces of tubing connecting said inlet and outlet means.

8. A battery according to claim 1 wherein said partition comprises a pair of plates bonded together.

9. A battery according to claim 8 wherein each of said plates defines one half of said passage.

10. A battery according to claim 9 wherein said one half is molded into one surface of said plate opposite a said face.

11. In a multicell, gas-recombinant, electric storage battery comprising a container, a plurality of galvanic cell elements each housed in a separate cell compartment of said container and comprising a plurality of opposite polarity plates alternately interspersed one with the other and spaced one from the other by an electrolyte-immobilizing mat, and an electrically nonconductive intercell partition separating one said cell compartment from the next, the improvement comprising a thin, substantially planar, liquid-cooled, heat exchanger disposed within each said cell compartment and lying in a plane substantially parallel to said partition, said heat exchanger having at least one external face confronting at least one said plate in said element in said compartment, at least one coolant flow passage disposed within said heat exchanger subjacent said face, inlet means at one end of said passage for supplying coolant to said passage, outlet means at the other end of said passage for exhausting said coolant from said passage, and conduit means connected to said inlet and said outlet means for supplying coolant to and removing coolant from said passages.

12. A battery according to claim 11 wherein, said passage has an elongated cross section in a direction transverse said passage so as to provide a wide passage having the majority of the surface defining the passage lying in planes substantially parallel to said external face.

13. A battery according to claim 12 wherein said heat exchanger is disposed within a said element, comprises first and second external faces on opposite sides thereof confronting adjacent plates of said element, and has said cooling passage interjacent said faces.

* * * * *